March 31, 1925.  1,531,561
J. W. LYNCH
TRAVELING FUNNEL GUIDE FOR GLASS FORMING MACHINES
Filed April 11, 1924   2 Sheets-Sheet 2

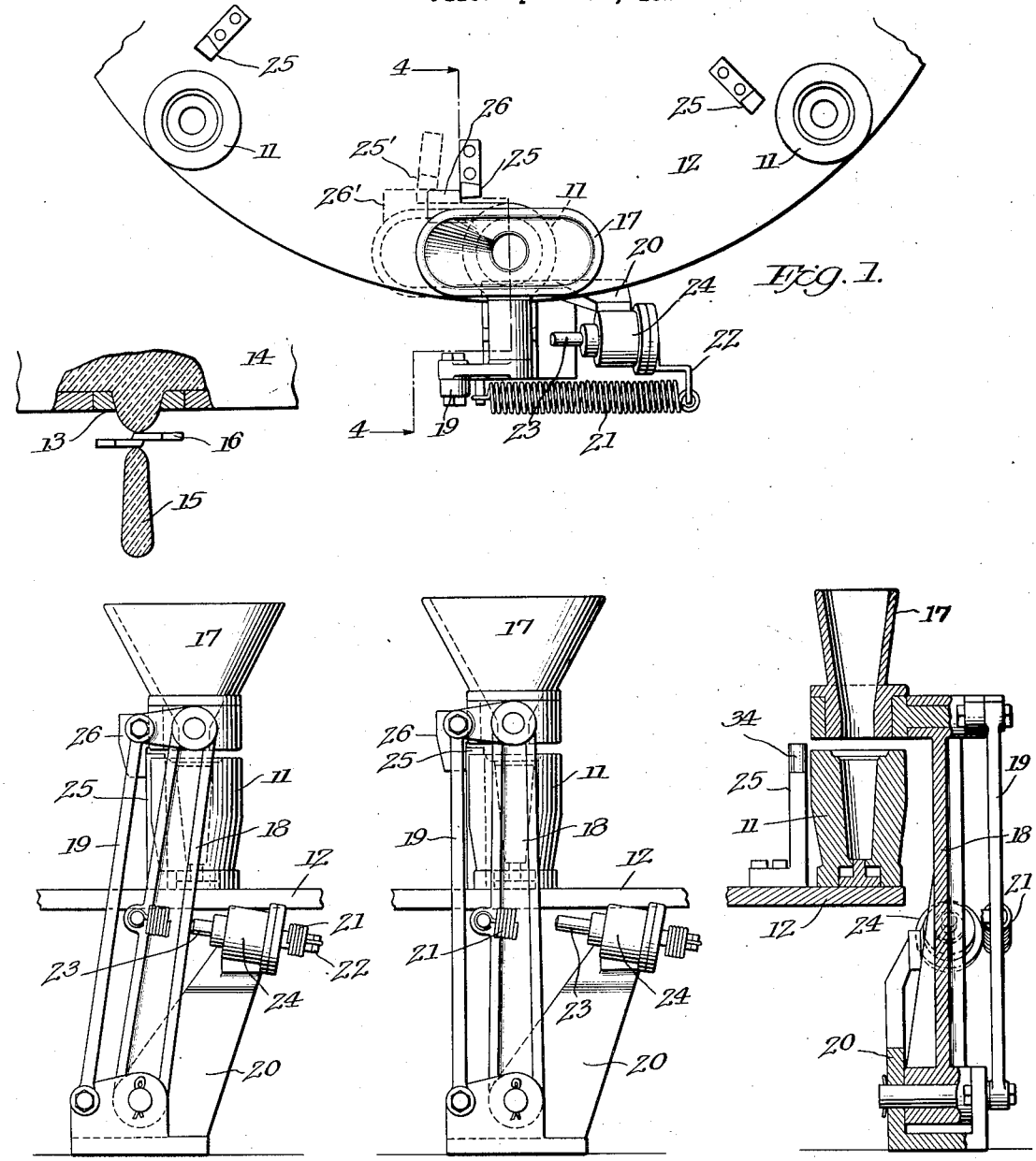

Inventor
James W. Lynch.
By Emery, Booth, Janney & Varney
his Attorneys

Patented Mar. 31, 1925.

1,531,561

UNITED STATES PATENT OFFICE.

JAMES W. LYNCH, OF ANDERSON, INDIANA, ASSIGNOR TO LYNCH GLASS MACHINERY COMPANY, OF ANDERSON, INDIANA, A CORPORATION OF INDIANA.

TRAVELING FUNNEL GUIDE FOR GLASS-FORMING MACHINES.

Application filed April 11, 1924. Serial No. 705,730.

*To all whom it may concern:*

Be it known that I, JAMES W. LYNCH, a citizen of the United States, residing at Anderson, in the county of Madison and State of Indiana, have invented an Improvement in Traveling Funnel Guides for Glass-Forming Machines (3), of which the following description, in connection with the accompanying drawings, is a specification, like characters on the drawings representing like parts.

This invention relates to feeding charges of molten glass from a tank to the molds of glass forming machines, more particularly of the type having continuously moving molds traveling in a circular path.

The invention aims to provide automatic means for guiding the "gobs" or "gathers" of glass, which are cut off in quick succession from a valve controlled intermittent or freely falling stream issuing from a tank by any suitable severing means, commonly designated a "feeder," into the moving molds as they pass successively beneath the orifice from the tank.

Other aims and advantages of the invention appear in connection with the description of the illustrative embodiment of the invention shown in the drawings, wherein—

Fig. 1 is a plan view of a portion of the rotatable mold carrying table of a glass forming machine, showing an illustrative form of traveling funnel guide applied thereto;

Fig. 2 is a side elevation of the same, showing the funnel in the normal position ready to receive a drop of glass;

Fig. 3 is a similar view showing the funnel in its mid-position over the moving mold;

Fig. 4 is a vertical cross-section of the device shown in Figs. 1, 2 and 3, on the line 4—4 in Fig. 1;

Figure 5:
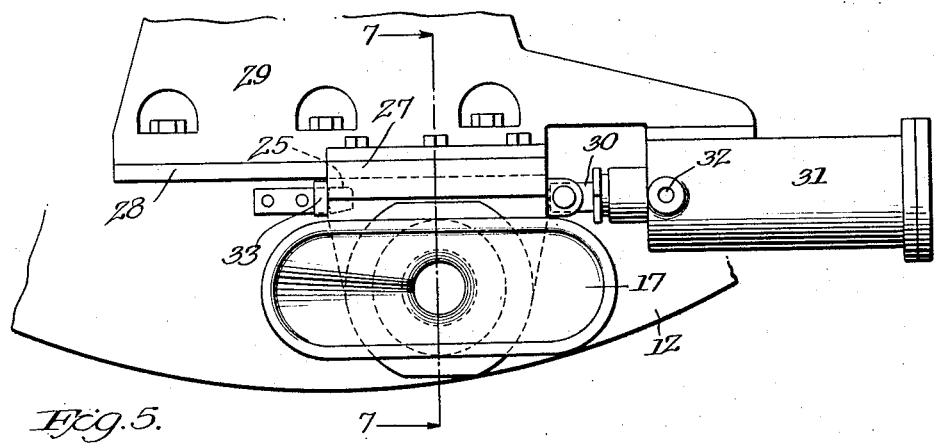
Fig. 5 is a plan view of another illustrative form of traveling funnel guide.

Glass forming machines heretofore in successful use with automatic devices for feeding them glass direct from the tank have generally been intermittent in their mode of operation, the molds being filled with glass while stationary. This mode of operation is hard on the machinery and slow, as it necessitates repeated starting and stopping. In the glass forming machine shown in the drawings for illustrating one mode of performing the invention, the molds 11 are mounted on a continuously rotating table 12 or support of any suitable kind, and are successively brought beneath the orifice 13 of the glass melting tank or container 14 for receiving their charges of molten glass. This is periodically cut off in the shape of drops 15, called "gobs" or "gathers," by shears 16 operated by any suitable mechanism, known as a "feeder." The "feeder" apparatus for cutting off the drops at required intervals and in suitable shapes for proper working in the glass forming machine forms no part of this invention.

A guide funnel 17, preferably elongated in the direction of movement of the table, is mounted for movement on the upper ends of the parallel links 18, 19, which are pivoted at their lower ends to the bracket 20. This arrangement holds the funnel erect while permitting it to swing back and forth through a short arc over the edge of the table substantially parallel to the direction of movement of the molds as they rotate therewith. A spring 21 connected to the link 18 at one end and to a bracket 22 at the other end normally holds the funnel against the stop 23 operating in the dash pot cylinder 24 in its waiting position (as shown in Fig. 2) ready for receiving a drop of glass and cooperating with an approaching mold.

The mold table carries a series of operating fingers 25, one for each mold 11, which successively engage the catch 26 on the funnel mount as the molds approach the feeding position and swing the funnel in company with each mold in succession. As the molds recede from the feeding position, the paths of movement of the fingers 25 and catch 26 diverge until they reach the point where they disengage (as shown in dotted lines 25' and 26' in Fig. 1), whereupon the spring 21 returns the funnel to its normal waiting position against the stop 23. The orifice at the lower end of the funnel is somewhat smaller than the filling orifices at the upper ends of the molds, the difference in diameter being at least as great as the difference between the arc traveled by the molds and the chord thereof along which the funnel travels.

Figure 6:
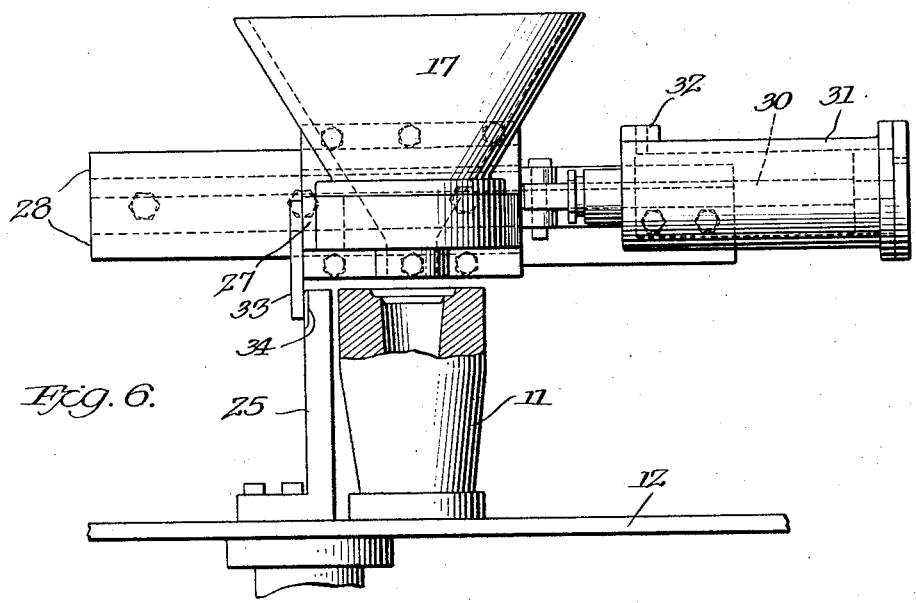
Fig. 6 is a side view of the same, showing the parts in initial feeding position.
Figure 7:
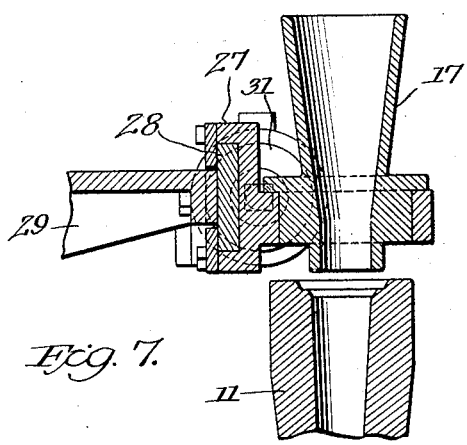
Fig. 7 is a vertical cross-section of the device shown in Figs. 5 and 6 on the line 7—7 in Fig. 5.

The form of the invention illustrated in Figs. 5, 6, and 7 comprises a funnel 17 carried by a slide 27, which is arranged to reciprocate on a way or guide 28 supported by a bracket 29 so as to be positioned over the path of movement of the molds 11. Normally the slide 27 and funnel are held in waiting position by means of a piston and rod 30 operating in the cylinder 31 to which air is supplied by the pipe 32. The operating fingers 25 on the table 12 successively engage a depending lug 33 on the slide 27 to move the slide and funnel in time with the molds, the engagement and disengagement being similar to the action of the pivotally mounted funnel illustrated in Figs. 1 to 4, inclusive. The operating faces 34 of the fingers 25 are curved to a suitable arc to cooperate with the lug 33 on the slide throughout the constantly changing angular position of the engaged members.

The funnel is of sufficient width of opening at its top to catch the drop of glass in whatever position it may be when the drop is sheared off, and as the lower end of the funnel is smaller than the opening into the mold and is constrained to follow closely the movement of the molds, the drop will be guided into the mold.

The operation of the guide funnel is entirely automatic, and timed to suit the speed of operation of the machine; and the arrangement of the springs and cushioning devices for moving the funnel arm is such as to permit of high speed of operation without excessive shock upon the operating parts.

The invention is not restricted to the forms and arrangement of parts shown, but may be adapted to forming machines of various types having continuously moving molds.

I claim the following as my invention:

1. A traveling funnel guide for forming machines having moving molds traveling in a curvilinear path, comprising a supporting member movable in a path substantially a chord of said curvilinear path, a funnel carried by said supporting member with its throat immediately above the open tops of said molds during their movement through the arc subtended by said chord, and engaging means moving with the molds for engaging and moving said funnel in time with successive molds.

2. A traveling funnel guide for forming machines having moving molds traveling in a curvilinear path, comprising a supporting member movable in a path substantially a chord of said curvilinear path, a funnel carried by said supporting member with its throat immediately above the open tops of said molds during their movement through the arc subtended by said chord, and engaging means moving with the molds for engaging and moving said funnel in time with successive molds, said engaging means automatically disengaging upon reaching a predetermined point in the paths of movement of said molds and supporting member.

3. A traveling funnel guide for forming machines having molds traveling in a cyclical path comprising a movable funnel and means for guiding said funnel in an independent path immediately above that of said molds, means traveling with the molds for moving said funnel, and means traveling with the funnel for cooperating with said means traveling with the molds during a predetermined range of movement thereof.

4. A traveling funnel guide for forming machines having molds traveling in a cyclical path comprising a movable funnel and means for guiding said funnel in an independent path immediately above that of said molds, means traveling with the molds for moving said funnel, and means traveling with the funnel for cooperating with said means traveling with the molds during a predetermined range of movement thereof, said traveling means being carried out of cooperative relationship by the diverging of the paths of travel.

5. A traveling funnel guide for forming machines having molds traveling in a cyclical path, a funnel and supporting means therefor movable in an independent path immediately above that of said molds for a feeding portion of said cyclical path, power driven spring members movable with said molds and adapted to engage successively with a cooperating part of said funnel supporting means during said feeding portion of said cycle, and means for returning said funnel supporting means to its starting position during intervening intervals between successive feeding movements of said molds.

6. A traveling funnel guide for forming machines having molds traveling in a cyclical path, a funnel and supporting means therefor movable in an independent path immediately above that of said molds for a feeding portion of said cyclical path, power driven members movable with said molds and adapted to engage successively with a cooperating part of said funnel supporting means during said feeding portion of said cycle, and fluid pressure operated means for returning said funnel supporting means to its starting position during intervening intervals between successive feeding movements of said molds.

7. A traveling funnel guide for forming machines having molds traveling in a cyclical path, a movable mold carrier for said molds, a movable funnel for cooperating with said molds during a common portion of their cycle of movement, a slide upon which said funnel is mounted, a series of pins on said table, one for each mold, a catch on said slide adapted to be engaged by said pins for moving said slide in the direction of movement of said molds, and an air cylinder and operating means therein for moving said slide in the opposite direction.

8. A traveling funnel guide for forming machines having molds traveling in a cyclical path, a movable mold carrier for said molds, a movable funnel for cooperating with said molds during a portion of their cycle of movement, a slide upon which said funnel is mounted, a series of pins on said table, one for each mold, a catch on said slide adapted to be engaged by said molds, operating means for moving said slide in the opposite direction, and cushioning means associated with said pin and catch and with said operating means for relieving the shock upon starting and stopping.

9. A traveling funnel guide for forming machines of the rotary table type having molds 11 moving continuously in a circular path, a funnel 17 mounted on a carrier and reciprocatable in a horizontal path above a sector of said table, driving means 25 on said table with its throat immediately over the tops of said molds for engaging said carrier, means for returning said carrier, and air cushion means for absorbing shock on stopping movement of said carrier.

In testimony whereof, I have signed my name to this specification.

JAMES W. LYNCH.